United States Patent [19]

Bletz et al.

[11] 4,080,611
[45] Mar. 21, 1978

[54] APPARATUS FOR STORING A VOLTAGE ANALOGOUS TO AN EXPOSURE PARAMETER IN PHOTOGRAPHIC CAMERAS

[75] Inventors: Walter Bletz, Braunfels; Werner Holle, Wetzlar, both of Germany

[73] Assignee: Ernst Leitz GmbH, Wetzlar, Germany

[21] Appl. No.: 701,680

[22] Filed: Jul. 1, 1976

Related U.S. Application Data

[63] Continuation-in-part of Ser. No. 565,621, Apr. 7, 1975, which is a continuation of Ser. No. 383,295, Jul. 6, 1973.

[30] Foreign Application Priority Data

Aug. 28, 1972 Germany ............................. 2242300
Mar. 31, 1973 Germany ............................. 2316261

[51] Int. Cl.² .......................... G03B 9/62; G03B 7/08
[52] U.S. Cl. .................................. 354/23 D; 354/50; 354/60 A
[58] Field of Search .................. 354/23 D, 24, 29, 38, 354/50, 51, 60 R, 60 A, 52

[56] References Cited

U.S. PATENT DOCUMENTS

| | | | |
|---|---|---|---|
| 3,603,799 | 9/1971 | Nobusawa | 354/23 D |
| 3,703,130 | 11/1972 | Watanabe | 354/23 D |
| 3,727,526 | 4/1973 | Hinds | 354/52 |
| 3,742,826 | 7/1973 | Kohtani | 354/23 D |
| 3,748,979 | 7/1973 | Wada | 354/23 D |
| 3,988,069 | 10/1976 | Kitaura | 354/23 D |

FOREIGN PATENT DOCUMENTS

| | | | |
|---|---|---|---|
| 2,365,045 | 7/1974 | Germany | 354/23 D |
| 2,356,361 | 5/1974 | Germany | 354/23 D |
| 45-4903 | 2/1970 | Japan | 354/51 |

*Primary Examiner*—Russell E. Adams
*Attorney, Agent, or Firm*—Gilbert L. Wells

[57] ABSTRACT

Apparatus for storing a voltage analogous to an exposure parameter in photographic cameras with an electronic timer and with electric exposure measurement, having the characteristics that an analog-to-digital converter is provided as the storage unit, containing a digital-to-analog converter, the output voltage of which is fed to a comparator wherein this output voltage is compared with the voltage delivered by the exposure meter part. The signal obtained at the comparator output in the case of voltage identity stops the analog-to-digital converter and the voltage remaining at the output of the digital-to-analog converter controls the respective exposure parameter in the camera.

2 Claims, 8 Drawing Figures

APPARATUS FOR STORING A VOLTAGE ANALOGOUS TO AN EXPOSURE PARAMETER IN PHOTOGRAPHIC CAMERAS

CROSS-REFERENCES TO RELATED APPLICATIONS

The present application is a continuation-in-part of application Ser. No. 565,621, filed Apr. 7, 1975, which in turn is a continuation of application Ser. No. 383,295, filed July 26, 1973.

Applicants claim priority under 35 U.S.C. 119 for application No. P 22 42 300.3, filed Aug. 28, 1972, and application No. P 23 16 261.0, filed Mar. 31, 1973 in the Patent Office of the Federal Republic of Germany. The priority documents are contained in the file of application Ser. No. 383,295.

The disclosure of assignee's copending application Ser. No. 346,576, filed Mar. 30, 1973 in the U.S. Patent Office, now U.S. Pat. No. 3,785,364, is incorporated herein. Application Ser. No. 346,576 discloses the state of the art of camera shutters having electrically controlled delay releasers and the present apparatus is useful with these shutters.

BACKGROUND OF THE INVENTION

The present invention relates to an apparatus for the storage of a voltage analogous to an exposure parameter in photographic cameras with an electronic timer and with electric exposure measurement.

It is known to provide an electronic timing mechanism in photographic cameras, wherein the capacitor of an RC circuit is charged via a photoconductive cell. The charging takes place during exposure, and the latter is terminated once the capacitor charge has reached a certain potential.

However, such a mechanism cannot be used in many cases, for example it cannot be used if the photoconductive cell cannot be exposed to the light during the operation of the shutter. In these cases, a voltage analogous to the exposure time must stored prior to the actuation of the camera shutter, from which the exposure time is formed later on. The same holds true for spot measurements wherein the object brightness is measured only in a portion of the picture area.

Many suggestions have been advanced for such storage methods. However, all of these conventional suggestions have the disadvantage that either the storage procedure can be effected only briefly (capacitor storage) or that mechanical/electrical components must be employed permitting a quasi-mechanical voltage storage. A potentiometer, for example, can be used as such a mechanical/electrical component.

The setting of such a mechanical/electrical component has, however, the disadvantage that it requires a certain strength, and furthermore is relatively slow. Thus, a potentiometer, for example, must be brought into the correct position by a mechanical force, and other similar elements, such as servomotors and the like, also require a special adjusting force.

Therefore, the present invention is based on the problem of providing a long term storage device operating with purely electronic means and not requiring any mechanical adjusting force for the operation. In this connection, it is, first of all, of secondary importance which exposure parameter or voltage analogous thereto is stored in this storage device. This can be, for example, a voltage analogous to the exposure time. However, it is also possible for the storage to be one which is analogous to the luminous density of the object, or a voltage analogous to the luminous density of the object under consideration of the film sensitivity, and finally, this voltage can also be one which is analogous to the diaphragm.

SUMMARY OF THE INVENTION

According to the invention, this problem is solved by using as the storage means an analog-to-digital converter containing a digital-to-analog converter, the output voltage of which is fed to a comparator wherein this output voltage is compared with the voltage supplied by the exposure meter part; and by providing that the signal obtained at the comparator output in the case of voltage identity stops the analog-to-digital converter; and that the voltage remaining at the output of the digital-to-analog converter controls the respective exposure parameters in the camera.

Accordingly, the invention resides, in principle, in that the voltage to be stored which is analogous to one of the aforementioned exposure parameters is digitized, and in an associated digital-to-analog converter, a voltage is again obtained which is analogous to the digitized value, which voltage is retained at the instant at which it is equally high as the originally transmitted analogous voltage. This retained voltage then is available for a longer period of time, in order to form therefrom the respective exposure parameter in one of the many ways known for this purpose.

Actually, the apparatus of the present invention can be equipped with any desired analog-to-digital converter of known construction. However, a special suggestion of this invention provides for this purpose a binary counter controlled by a pulse generator, e.g., a multivibrator. This multivibrator is activated for storage upon "store" command or — as will be explained further below — continuously self-reactivates for storage and is arrested upon a storage command at the last-stored value. After the inactivation of the multivibrator, the binary counter then serves as the storage unit.

Basically, the apparatus can be constructed in two different embodiments, namely, on the one hand, in such a way that once the voltage analogous to the digitized value has been accumulated, triggered by the operation of the starting switch, this voltage is stored and is erased again only after another activation of the starting switch or after the exposure meter has been turned off after the photograph has been taken. On the other hand, however, it is also possible to install electronic means which hold the accumulated voltage automatically in each case only for a specific period of time, e.g., for 100 milliseconds (holding phase) and thereafter erase the binary counter, so that a new accumulation phase is initiated (repetitive accumulation). This second embodiment is more voluminous in circuit components, but has the advantage that changing brightness conditions are constantly taken into account, and the storage content to be employed is already known prior to the final storing for the exposure.

The final storing of the voltage analogous to the supplied voltage takes place in this embodiment by interrupting the erasure and the new storing operation, so that the last-stored value remains. Accordingly, circuit elements for the interruption of this new storage step are additionally provided, which can be constructed, for example, as a storage key, or can also be arranged at the camera shutter button as a control contact.

BRIEF DESCRIPTION OF THE DRAWINGS

Further details of the invention are explained with reference to the drawings wherein the present invention is shown schematically in block diagrams in various embodiments.

FIG. 4b shows the detailed circuit of a stepping switch mechanism of the type used in FIG. 4a;

FIG. 4c shows the output voltage accumulation of the circuit of FIG. 4a; and

DESCRIPTION OF THE PREFERRED EMBODIMENTS

Figure 1:
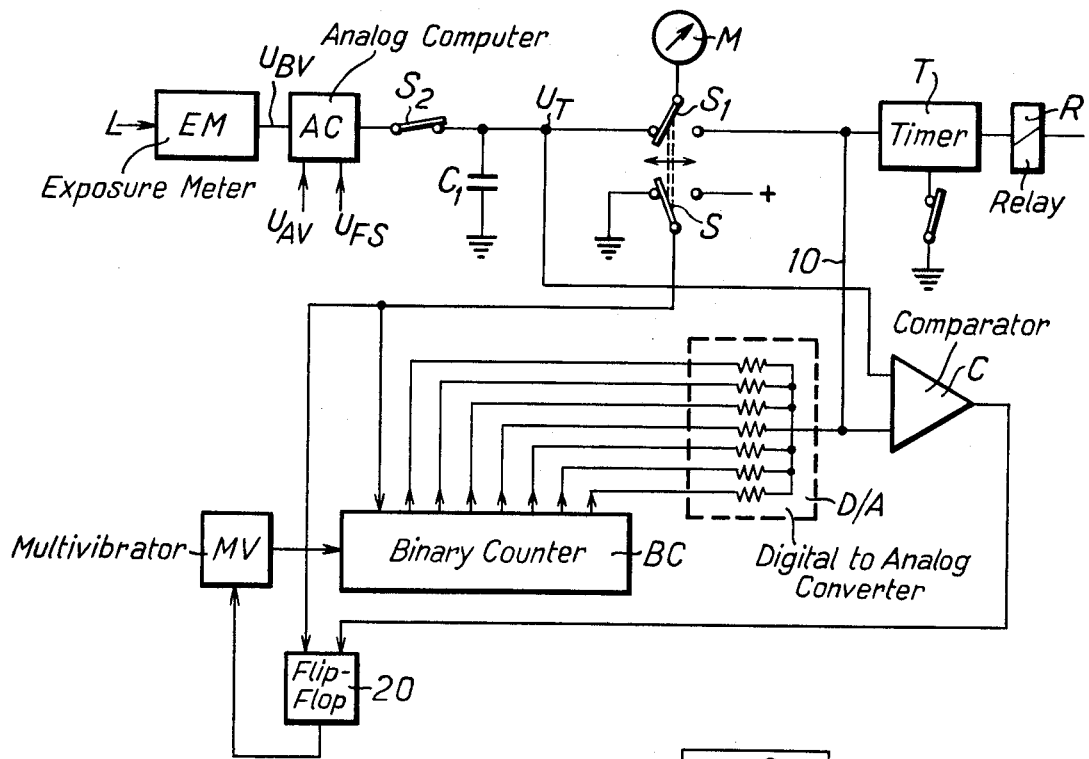
FIG. 1 shows a first embodiment of the invention wherein a voltage is stored which is analogous to the logarithm of the exposure time that is required in dependence on the object brightness, the film sensitivity and the selected f-stop value and wherein the stored voltage is accumulated only once.

In FIG. 1 an exposure meter EM is shown on the left hand side, associated with an analog computer AC. As such analog computer may be used a summing amplifier as, for example, disclosed on page 59 in the "Handbook of operational amplifier applications" 1963 edition. On the right hand side of the figure, a timer T for forming the exposure time, is illustrated, controlling a relay R which triggers conventionally the closing operation of the camera shutter at the end of the exposure time. The timer T may be a combination of a Schmitt-trigger with an RC circuit.

Furthermore, a binary counter BC is part of the block circuit diagram, controlled by multivibrator MV which latter, in turn, is activated when a switch S is actuated. The multivibrator may be of the type disclosed in FIG. 3a, page 354 in the RCA handbook on solid state, 1973 edition. As the binary counter may be used a counter offered for sale under type No. CD 4024 by the RCA corporation. A digital-to-analog converter designated D/A in the FIG. 1 is connected after the binary counter. This digital-to-analog converter is simply a resistor network as indicated in the drawing. Furthermore, a comparator C is provided in the circuit, serving for voltage comparison, as well as an indicating instrument M (which can be switched over together with switch S by a switch $S_1$. The comparator C may, for example, be a micro power operational amplifier as offered for sale by the RCA corporation under type No. CA 3078.

These components are connected in the following way and with the following function:

A light flux L impinging on the exposure meter EM produces therein a voltage $U_{BV}$ proportional to the logarithm of the brightness value of the object to be photographed. This voltage $U_{BV}$ is fed to the analog computer AC, to which are applied furthermore additional voltages, e.g., $U_{AV}$ and $U_{FS}$ proportional to the aperture value and the film sensitivity. From all of these voltages, the analog computer AC forms a voltage $U_T$ which is analogous to the logarithm of the exposure time proportional to the brightness of the object under consideration of the selected diaphragm and the film sensitivity. This analogous voltage $U_T$ appears at the output of the analog computer and is fed from there to one of the inputs of comparator C. Of course, $U_T$ is present only as long as light impinges on the exposure meter EM. If this is not the case, for example because a photoconductive cell pertaining to the exposure meter and not illustrated herein is pivoted out of the beam path, then this voltage breaks down. However, for the short term holding of this voltage, a capacitor $C_1$ is furthermore provided, which holds the voltage after opening a switch $S_2$ coupled with the camera shutter button at least until the storage operation has been completed.

It is also possible to provide a meter M for the voltage $U_T$ in the circuit, which meter is directly calibrated in exposure time units, so that the person using the camera can constantly read off the exposure time to be expected.

The switch S is connected, in a way not important to the invention and thus not illustrated in detail, to a storage key at the camera. This key can either be a separate push button, or it can also be constructed as a forward extension of the shutter release. When the key is actuated, the switch S is changed over. Thereby the binary counter BC is reset to zero condition and at the same time the multivibrator MV is activated by way of a flip-flop 20. The pulses of the multivibrator are fed to the binary counter BC. Digital signals appear at the outputs of the binary counter and are fed to the digital-to-analog converter. The latter forms from these digital signals a summed-up analog voltage which is applied to the second input of the comparator C. The comparator C compares this stepwise accumulating added voltage with the voltage $U_T$, and, if both are identical, a 1 signal appears at the output of the comparator. This signal is fed to the flip-flop 20, which is switched over and, in turn, stops the multivibrator MV, so that no pulses can pass to the binary counter. Thus, a voltage has been retained at the output of the digital-to-analog converter which is identical to the voltage $U_T$ and which is applied to the timer T by the connection 10 for forming therefrom an analogous exposure time if the voltage $U_T$ has already broken down.

The meter M is switched over by means of the switch $S_1$, which is coupled with the switch S, namely away from the output of the analog computer AC to the input of the timer T. Thereby, prior to the storage command, the time indication follows all variations and on the other hand, indicates the stored time after the storage step has been effected.

Figure 2:
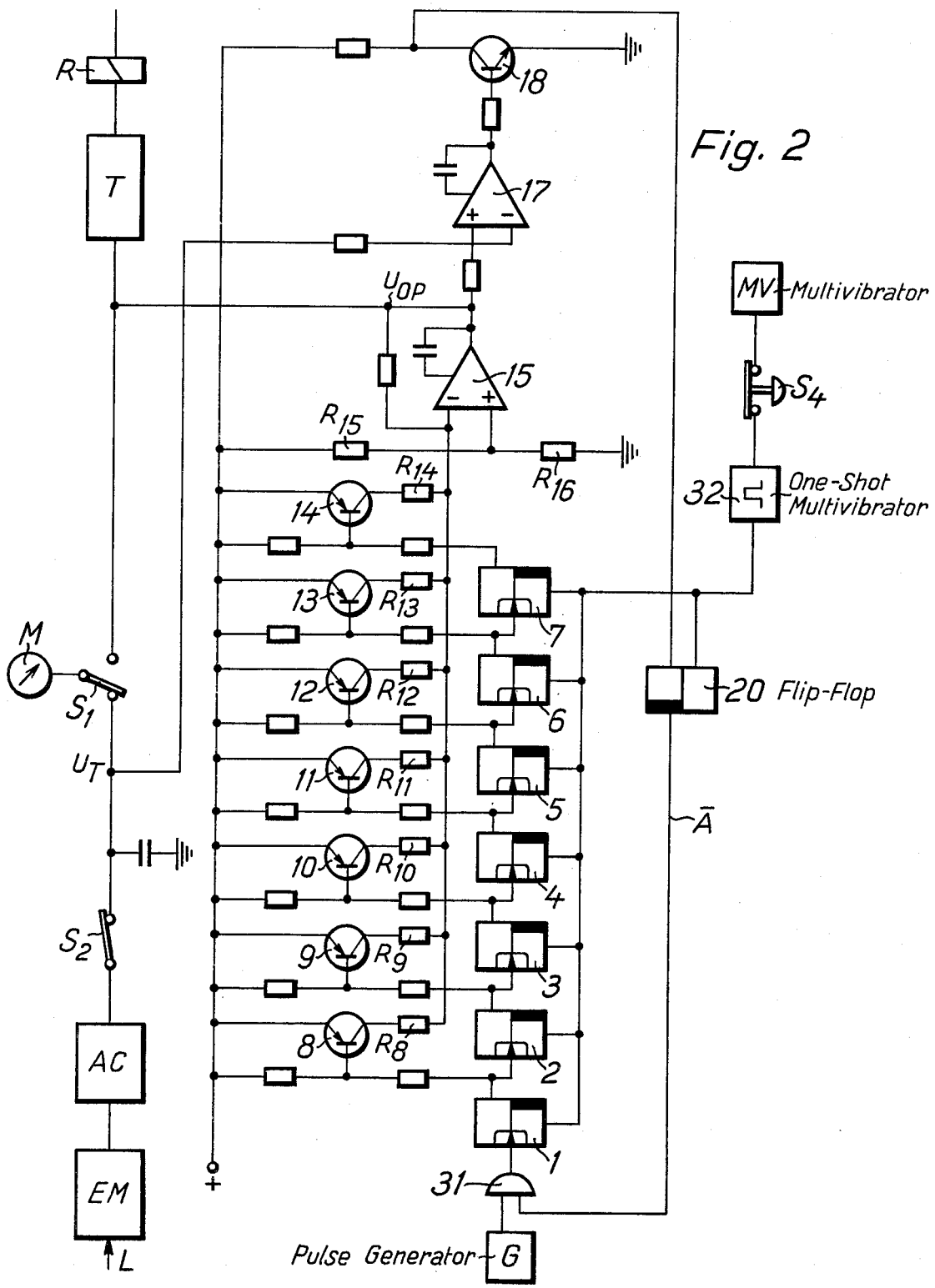
FIG. 2 shows an embodiment according to FIG. 1 with repetitive accumulation.

FIG. 2 shows a second embodiment of the invention which is distinguished in that electronic means are included which retain the voltage analogous to voltage $U_T$ only for a short time, and then erase the binary counter and again allow the analogous voltage to accumulate. Thereby, a constant adaptation to any possible changing object brightness is made possible. Besides, the circuit is illustrated in greater detail in the zone of the binary counter.

In this circuit, there are again the exposure meter EM, the analog computer AC, as well as the timer T with the relay R connected thereafter. The steps of the binary counter are designated by the numerals 1 – 7, associated with transistors 8 – 14 as illustrated in the drawing. The collector currents of these transistors flow via the resistors $R_8 - R_{14}$. These resistors are coupled together and are commonly connected to the inverting input of a first operational amplifier 15. The output of the operational amplifier 15 leads to the non-inverting input of a second operational amplifier 17, to whose inverting input the voltage $U_T$ is applied.

The pulses from a pulse generator G are fed to the binary counter 1 – 7 via an NAND gate 31. The other input of this NAND gate is connected to the output of a flip-flop 20, receiving pulses from a one-shot multivibrator 32. The latter is, in turn, connected to a multivibrator MV vibrating at a comparatively low frequency of, e.g., 10 Hz.

The binary counters 1 – 7 are assumed to be at first in the zero state, i.e., the transistors 8 – 14 are assumed to be conductive. Consequently, currents flow through the resistors $R_8 - R_{14}$. Accordingly, 0 volt is present at the output of the operational amplifier 15 ($R_{15} = R_{16}$).

If $U_T$ is larger than 0 volt, then the output of the operational amplifier 17 is negative, an associated transistor 18 is nonconducting. The transistor 18 becomes conductive and thus sets the flip-flop 20, as soon as voltage identity has been reached at the operational amplifier 17 by the accumulation of the binary counters. The flip-flop stops the pulse sequence via the NAND gate 31, which sequence is conducted from the generator G to the binary counter 1 – 7. This logic gate 31 can, of course, also be present in the generator proper, in the manner shown in FIG. 3a. While the two inputs of one NAND gate 30 are connected with each other and the gate thus operates as a simple inverter, one input of the other NAND gate 31 is connected to the output of the flip-flop 20. The generator can be arrested via this logic circuit input.

Figure 5:
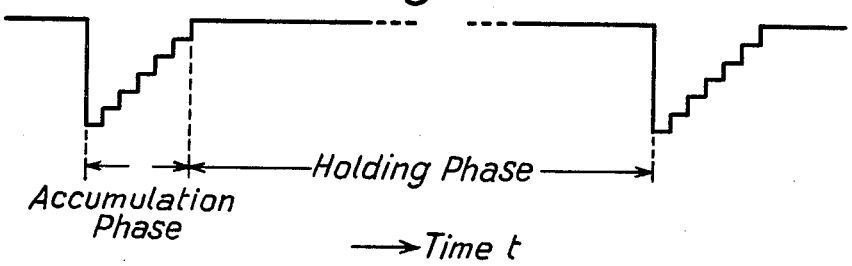
FIG. 5 shows the output voltage characteristic of a circuit with repetitive voltage accumulation.

The multivibrator MV vibrates constantly at a frequency of, for example, 10 Hz. The one-shot multivibrator 32 is excited by means of the negative flank of the multivibrator pulses which appear every 100 milliseconds. This one-shot multivibrator applies a short resetting pulse to the binary counters 1 – 7 and to the flip-flop 20. Thereafter, a new cycle begins with the accumulation of the binary counters. FIG. 5 shows, for example, the curve of the voltage as it accumulates at the true input of the comparator 15.

Figure 3A:
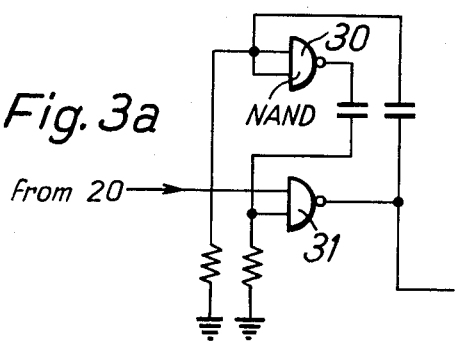
FIG. 3a shows an embodiment of the pulse generator of FIGS. 2 and 3 in detail.
Figure 3:
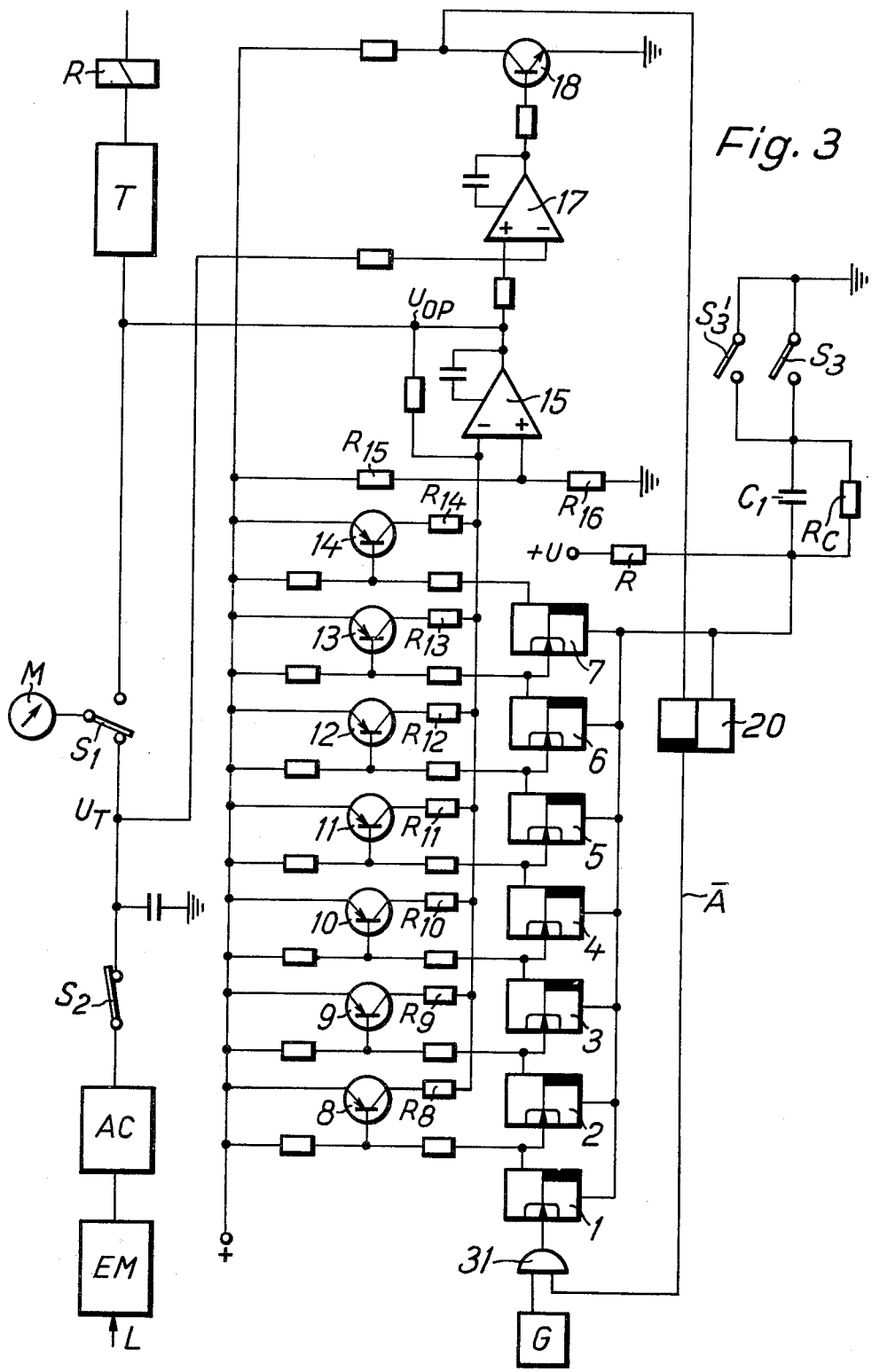
FIG. 3 shows the circuit of FIG. 2, but constructed as an embodiment wherein the stored voltage is accumulated only once.

FIG. 3 shows the same circuit as FIG. 2, but this time it is equipped as a circuit wherein the voltage is only accumulated once. The binary counters are first at any arbitrary value. Upon triggering the release, shortly prior to the opening of the shutter, the flip-flop 20 is set with switch $S_3$ via a capacitor $C_1$, so that the binary counter can accumulate the value to be stored within a short period of time, and thus the voltage for the taking of the photograph is made available.

A test storing for reading off the exposure time to be expected may be accomplished the same way via a switch $S_3'$ but $S_3'$ is only connected to the storage key, i.e., no exposure operation is yet conducted.

Figure 4C:
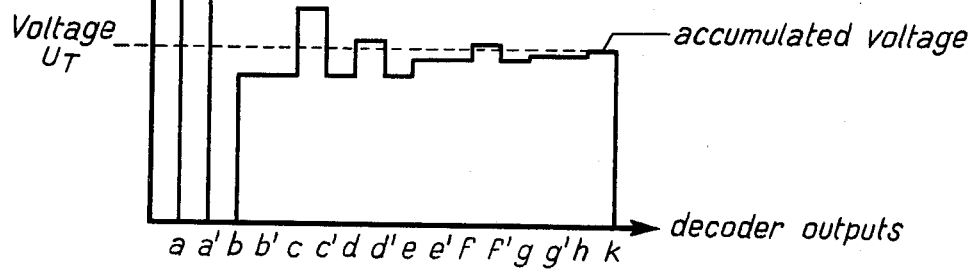
Figure 4A:
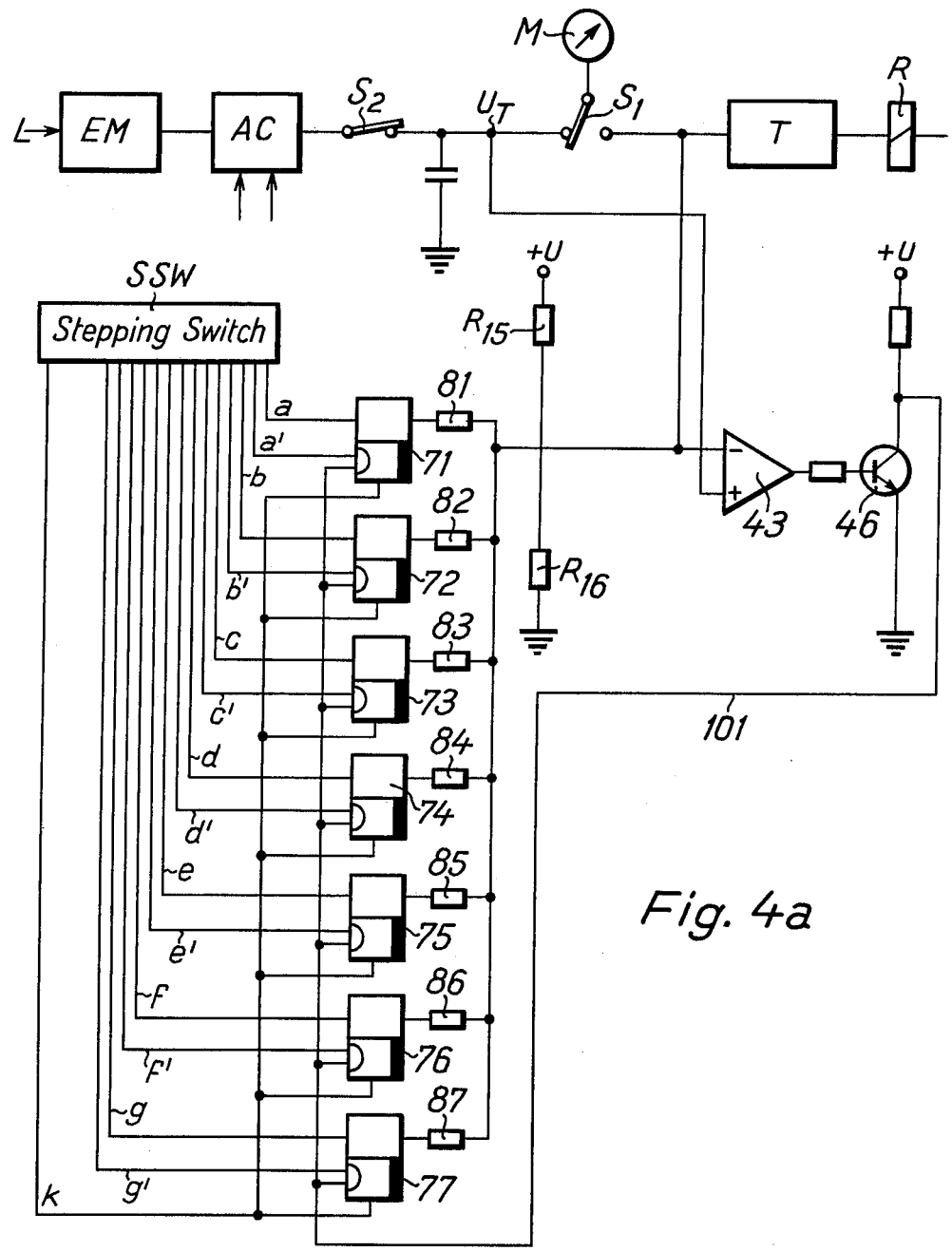
FIG. 4a shows a third embodiment according to FIG. 1 with repetitive accumulation.

While the embodiments in FIG. 2, 3a, and 3b require a maximum of $2^7 = 128$ steps until the input signal is stored, the storage state can be reached in the embodiment of FIG. 4a after 2 × 7 steps.

Figure 4B:
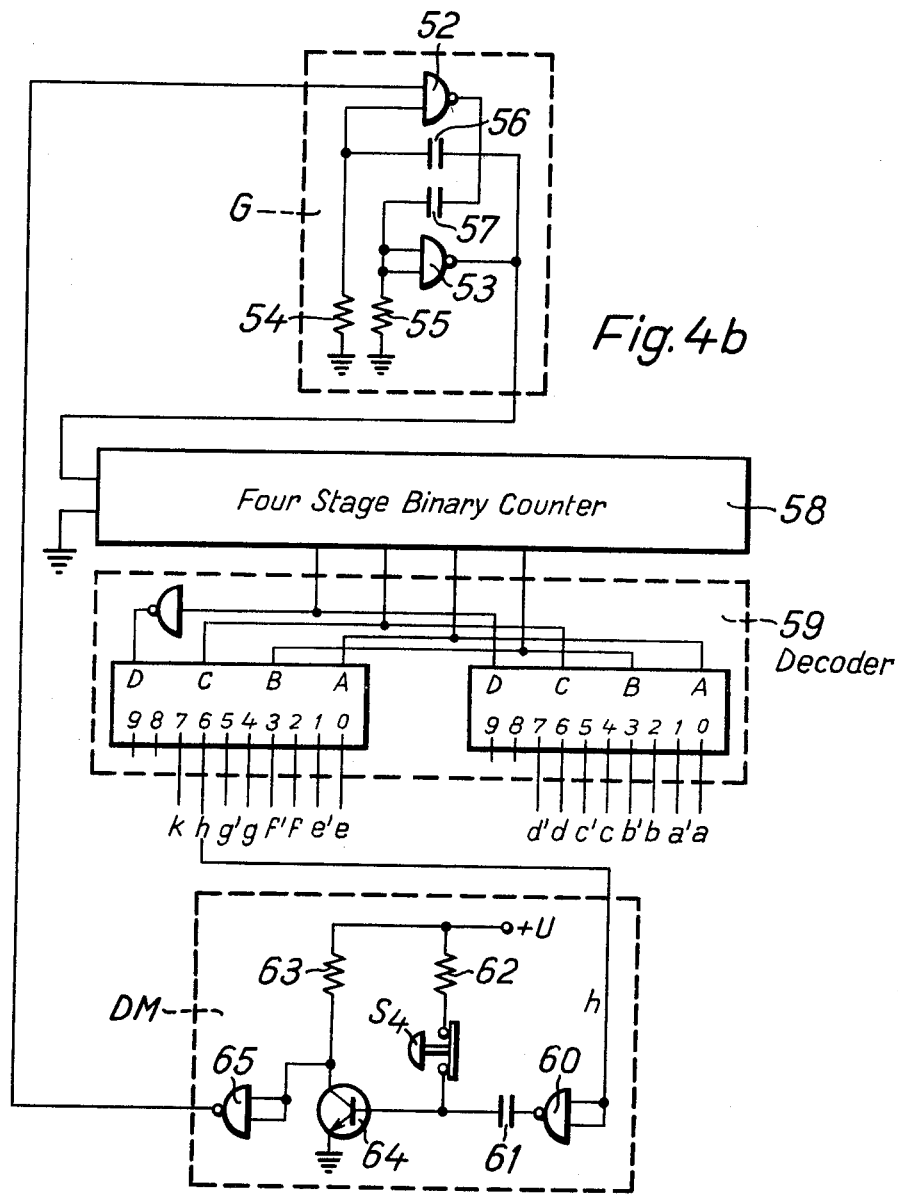

Whereas the functions of the operational comparator 43, as well as the meter M, the transistor 46, and the output of the exposure meter part are the same as those of the corresponding structural groups in FIGS. 2, 3a, and 3b, the other components operate as follows:

Among the outputs $a - k$ of a stepping switch mechanism only one output in each case carries a 1 signal. As shown in FIG. 4b, the stepping switch mechanism consists, for example, of a pulse generator G, with the elements 52 – 57, an associated four-stage binary counter 58 with decoder 59, and a delay member DM, with the elements 60 – 65. As the four stage binary counter there may be used a counter as sold by RCA corporation under the type No. CD 4024. This counter has actually seven outputs, however, only the four lower numbered ($Q_1 - Q_4$) may be used. The reset input is not used either and therefore connected to zero potential.

The 4 to 16 decoder 59 may be of conventional construction. If not available two 4 to 8 decoders may be used as sold by RCA corporation under type No. CD 4028. The two decoders must then be connected in the manner shown in FIG. 4b. It should be noted, however, that the input D requires an inverter 35 to decide which one of the two decoders should carry the 1 signal at one of its outputs.

The delay member DM is a network of inverters 60; 65 plus a transistor 64 and a RC combination 62; 61. The $h$-output of the decoder 59 is fed directly to the delay member and has the effect that for approximately 100 milliseconds the connection between the inverter 65 and the pulse generator G carries a 0 signal which stops the generator. Further a switch $S_4$ is provided therein the opening of which also causes a 0 signal in said connection, thus also blocking the generator G.

The outputs $a - h$ of the decoder assume successively a 1 signal corresponding to the frequency of the multivibrator. The 1 signal at the output $h$ then blocks the multivibrator over a period (100 milliseconds) formed by the resistor 62 and the capacitor 61. The following output $k$ resets all flip-flops 71 – 77, whereupon a new evaluation cycle begins. The resistors 81 – 87 are in each case increased by the factor 2. Upon the cycle $a$, the flip-flop 71 is first placed into the 1 state. If the voltage obtained thereby at the input of the comparator 43 is too high, then the flip-flop 71 is again reset with the subsequent cycle $a'$. In contrast hereto, if the voltage thus obtained is still too low, then the cycle $a'$ does not become further effective. With cycle $b$, the balancing then begins, made more sensitive by the factor 2, until finally the balancing step is terminated with the cycles $g$ or $g'$, respectively. At this point, the delay of, for example, 100 milliseconds occurs, effected by the cycle $h$. During this pause, the storage step is thus conducted. If no new balancing cycle is to begin, the switch $S_4$ is opened.

The function of the circuitry of FIG. 4a will best be understood with references to FIG. 4c. First be it assumed that a voltage $U_T$, which in logarithmically condensed form corresponds to the required exposure time, is present at the true input of the comparator 43, and further be it assumed that the pulse generator G constantly generates pulses. This can be done because the current consumption of the generator is extremely low so that no undue drainage of the battery occurs.

Under these conditions the outputs $a - k$ of the decoder 59 assume successively a 1 signal. First the output $a$ carries a 1 signal which triggers the flip-flop 71 so that a voltage appears at the inverted input of the comparator 43 the magnitude of which depends on the resistance value of the resistor 81. If this voltage exceeds the voltage $U_T$ in magnitude as shown in FIG. 4c a 1 signal appears at the comparator output and consequently also in the connection 101 from the transistor 46 to the flip-flops, especially to flip-flop 71. If now, subsequently, the decoder output $a'$ carries a 1 signal this 1 signal plus the 1 signal from the connection 101 will reset the flip-flop 71 to its nondonductive state. As a result no more voltage potential will be present at the inverted input of the comparator 43.

Then the output $b$ will carry a 1 signal which sets the flip-flop 72 to its conductive state. Since the resistor 82 has twice the resistance value of the resistor 81 — because the resistors 81 - 87 are in each case increased by the factor 2 — the voltage appearing at the comparator input will only have half of the magnitude of that of the previous voltage. This voltage potential, however, does not reach the magnitude of the voltage $U_T$. Consequently no 1 signal appears in the connection 101, which rather continues to carry a 0 signal. As a consequence thereof, the flip-flop 72 is not reset to its nonconductive state when, subsequently, the output $b'$ carries a 1 signal.

Then the output $c$ carries a 1 signal which sets the flip-flop 73 to its conductive state. This causes a voltage of half of the magnitude of the previous voltage to appear at point 102 and to be added to the voltage already present at the comparator input. If, now, the sum of the two voltages exceeds the voltage $U_T$ in magnitude a 1 signal will appear in the connection 101 which, together with the subsequent 1 signal in the output $c'$ will reset the flip-flop 73 to its nonconductive state so that the second voltage will disappear.

Then the output $d$ will carry a 1 signal and a voltage corresponding to the resistor 84 will be added. If the sum of the voltages does not yet reach the magnitude of $U_T$ the flip-flop 74 will remain in its conductive state. Otherwise, it will be reset as shown in FIG. 4c.

From the foregoing it will be comprehended that by successively providing a 1 signal in the outputs $a - g$ a stepwise accumulation of voltages is obtained which in total will just equal the voltage $U_T$ (or remain below the voltage only to a negligible amount; the accumulated voltage would always exactly equal the voltage $U_T$ if a decoder with an infinite number of outputs would be used). This voltage is then also supplied to the timer T which forms therefrom the shutter time in a known manner.

The delay member DM has the effect that the penultimate 1 signal in this sequence — which appears in the $h$ output — blocks the generator G for a certain period of time, namely for the discharging time of the capacitor 61, e.g., for 100 milliseconds. Thus, for these 100 milliseconds a voltage equal to the voltage $U_T$ appears at the input of the timer T and the whole circuitry is at a pause. Then the subsequently following 1 signal in the output K resets all flip-flops to their nonconductive state and the described cycle begins again.

The accumulated voltage may be maintained for a longer period of time at the input of the timer T if the switch $S_4$ in the delay member DM is opened. As already described the opening of the switch also blocks the generator G. The switch $S_4$ is therefore connected to the camera release button and forms a forward extension thereof so that when the release button is pushed the switch $S_4$ is opened well in advance of the actual shutter release.

For sake of simplicity the elements shown in FIG. 4b, i.e., the pulse generator G, the binary counter 58, the decoder 59 and the delay member DM are in FIG. 4a all encased in one common box named "Stepping Switch" and designated SSW.

We claim:

1. Apparatus for storing a voltage analogous to the exposure time and causing the closing of the shutter at the end of said time interval in a photographic camera comprising:
   (a) an electric exposure meter for generating a signal analogous to the brightness of the object to be photographed;
   (b) means for generating a signal analogous to the preselected lens diaphragm and means for generating a signal analogous to the film sensitivity;
   (c) an analog computer to which said signals are supplied and wherefrom a signal analogous to the exposure time is generated;
   (d) a plurality of flip-flops.
   (e) one resistor connected to each flip-flop, the resistance values of said resistors increasing by the factor 2 and all resistors connected to one common terminal;
   (f) a stepping switch having outputs connected to said flip-flops, said outputs assuming successively a 1 signal;
   (g) a comparator (43) connected to said common terminal of resistors and to the output of said analog computer, said comparator yielding a pulse when said signal from said amplifier equals said signal from said analog computer, thereby resetting all said flip-flops to their 0 state;
   (h) a time generator (T) connected to said amplifier; and
   (i) a relay connected to said time generator, said relay closing the camera shutter at the end of the exposure time.

2. The apparatus of claim 1, wherein said stepping switch comprises a multivibrator, an associated four state binary counter, a decoder and a delay member.

* * * * *